United States Patent [19]

Tsuyuguchi et al.

[11] Patent Number: 5,357,384
[45] Date of Patent: Oct. 18, 1994

[54] ROTATING DISK DATA STORAGE APPARATUS CAPABLE OF PREVENTING HEAD TRAVEL WHEN THE DISK IS NOT LOADED

[75] Inventors: Hiroshi Tsuyuguchi, Tokyo; Shinichiro Tanaka, Hatuyama; Tohru Miura, Mitaka; Miya Enami, Higashikurume; Hikaru Tamada, Inagi; Yoshiaki Sakai, Higashikurume, all of Japan

[73] Assignee: TEAC Corporation, Tokyo, Japan

[21] Appl. No.: 179,654

[22] Filed: Jan. 10, 1994

Related U.S. Application Data

[63] Continuation of Ser. No. 774,079, Oct. 9, 1991, abandoned.

[30] Foreign Application Priority Data

Oct. 15, 1990 [JP] Japan .................................. 2-275670

[51] Int. Cl.⁵ .............................................. G11B 21/02
[52] U.S. Cl. .................................. 360/75; 360/97.01; 360/105
[58] Field of Search ............... 360/75, 97.01, 99.06, 360/105; 369/77.1, 190, 191, 203, 204, 261, 75.2

[56] References Cited

U.S. PATENT DOCUMENTS

| | | | |
|---|---|---|---|
| 4,604,666 | 8/1986 | Kitahara et al. | 360/99 |
| 4,783,706 | 11/1988 | Shoji et al. | 360/75 |
| 4,816,942 | 3/1989 | Tanishima et al. | 360/75 |
| 4,884,261 | 11/1989 | Dalziel | 360/105 |

*Primary Examiner*—Aristotelis Psitos
*Assistant Examiner*—Muhammad N. Edun
*Attorney, Agent, or Firm*—Woodcock Washburn Kurtz Mackiewicz & Norris

[57] ABSTRACT

A flexible magnetic disk drive is disclosed which has a data transducer mounted to a pivotal support beam for movement into and out of data transfer contact with the disk. When the transducer is retracted away from the disk, the support beam butts on the top plate of the disk drive casing for the reduction of the thickness of the disk drive, that is, its dimension in a direction perpendicular to the plane of the disk. A stepper motor is provided for moving the transducer across data tracks on the disk in response to external stepping pulses from a host system and to internal stepping pulses for recalibration. The application of such stepping pulses to a stepper motor control circuit is prevented when the disk is not loaded in the disk drive, in order to avoid the movement of the support beam in sliding contact with the top plate.

3 Claims, 3 Drawing Sheets

ROTATING DISK DATA STORAGE APPARATUS CAPABLE OF PREVENTING HEAD TRAVEL WHEN THE DISK IS NOT LOADED

This is a continuation of application Ser. No. 07/774,079, filed Oct. 9, 1991 now abandoned.

BACKGROUND OF THE INVENTION

Our invention relates generally to an apparatus having a data transducer (head) or transducers for data transfer (writing and/or reading) with a replaceable, rotating disk such as a flexible magnetic disk rotatably enclosed in a stiff jacket or housing to make up a disk cartridge. More particularly, our invention deals with a system in such a rotating disk data storage apparatus for preventing a stepper motor or like transducer positioning motor from moving the transducer or transducers when the disk is not loaded in the apparatus.

The flexible magnetic disk drive has found extensive use as a data storage device on small computing systems. We cite Kitahara et al. U.S. Pat. No. 4,604,666, assigned to the assignee of our present application, as a typical prior art disk drive pertinent to our invention. In this and other familiar disk drives, a pair of data transducers are provided for writing and/or reading data on both sides of the disk. Both transducers are moved across a multiplicity of concentric annular data tracks on the disk surfaces by a bidirectional electric motor such as a stepper motor. One of the transducers, moreover, which is mounted on a pivoted support beam, is movable away from the other for permitting the disk to be loaded in a preassigned data transfer position within the disk drive. The disk is caught between the transducers after having been placed in the data transfer position.

The current trend in disk drives is toward the minimization of their thickness or vertical dimension. In making this statement we assume that the disk is disposed horizontally in the data transfer position, with the pair of transducers disposed above and below the disk. The above objective inherently requires that the upper transducer be positioned as close as possible to the top plate of the casing of the disk drive, or to a shield plate or a printed circuit board if either of these is provided just under the top plate.

It may be contemplated, then, to hold the support beam, carrying the upper transducer, against the top plate, or to any other essentially equivalent part, when the upper transducer is moved away from the lower. This scheme is certainly advantageous purely from the standpoint of thickness reduction of the disk drive. However, if incorporated in prior art disk drives, it will bring about some inconveniences.

Conventionally, the stepper motor has been free to rotate in response to external stepping pulses from a host system even when the disk is not loaded in the disk drive. Also, the stepper motor has been driven by internal stepping pulses for recalibration, that is, for positioning the transducers over Track Zero on the disk, when the disk drive is electrically powered on, even if the disk is then not yet loaded therein. Since the upper transducer is held away from the lower when the disk is not loaded, the support beam would then travel in sliding contact with the top plate or the like, producing unpleasant noise. The support beam would also suffer abrasion as a result of the repetition of such sliding movement over an extended period of time.

Such inconveniences have also been liable to occur even if the transducer support beam is designed to make no contact with the top plate or the like. The support beam has nevertheless been easy to come into contact with the top plate or the like in the course of time, due for example to the deformation or displacement of a stop member, or of any other part associated therewith, for limiting the pivotal movement of the support beam.

SUMMARY OF THE INVENTION

We have hereby invented how to reduce the thickness or vertical dimension of a rotating disk data storage apparatus without the inconveniences set forth above.

Stated briefly, our invention concerns an apparatus for data transfer with a rotating data storage disk being replaceably held in a preassigned data transfer position within the apparatus. The apparatus comprises a data transducer movable between a working position, in which the transducer is capable of data transfer with the rotating disk being held in the data transfer position, and a retracted position in which the transducer permits the disk to be loaded in and unloaded from the apparatus. A conventional pivotal support beam or like support means holds the transducer in the retracted position when the disk is not in the data transfer position, and in the working position when the disk is in the data transfer position. When the transducer is in the retracted position, the support means may be held against a fixed member such as a top plate of the apparatus for the reduction of the size of the apparatus in a direction perpendicular to the principal plane of the disk being held in the data transfer position. The transducer is moved with the support means substantially radially of the disk by transducer positioning means. A disk sensor is provided for producing an output indicative of the disk is in the data transfer position or not. Our invention particularly features circuit means responsive to the output from the disk sensor for preventing the transducer positioning means from moving the transducer and the support means when the disk is not in the data transfer position, in order to avoid the movement of the support means in sliding contact with the top plate or the like.

Typically, the transducer positioning means include an electric stepper motor operated by drive pulses from a drive circuit which in turn is coupled to a stepper motor control circuit. Inputting stepping pulses and a stepping direction signal from an external host system, the stepper motor control circuit causes the drive circuit to apply the drive pulses to the stepper motor accordingly. The noted circuit means according to our invention functions to prevent the delivery of the stepping pulses to the stepper motor control circuit when the disk is not in the data transfer position.

Preferably, additional circuit means may be provided for delivering to the host system a false reference track signal falsely indicating that the transducer is positioned over an endmost reference track (e.g. Track Zero) on the disk, when the disk is not in the data transfer position and when, at the same time, the stepping direction signal commands the travel of the transducer toward the reference track. The false reference track signal serves to inform the host system that a seek error has occurred.

When the disk is subsequently loaded in the data transfer position, the transducer is automatically positioned over the reference track as the stepper motor control circuit receives internal stepping pulses and an internal stepping direction signal from a recalibration circuit. Now the host system is correctly informed by a reference track sensor that the transducer is over the reference track. A seek retry will then be completed.

Our invention also features the fact that the recalibration of the transducer to the reference track due to the internal recalibration circuit does not take place immediately when the apparatus is powered on, if then the disk is not yet loaded. The recalibration circuit is prevented from delivering the internal stepping pulses to the stepper motor until the disk is loaded. Thus, according to our invention, no external or internal stepping pulses are to be applied to the stepper motor control circuit when the support beam carrying the transducer is butting against the top plate or the like.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

Figure 1:
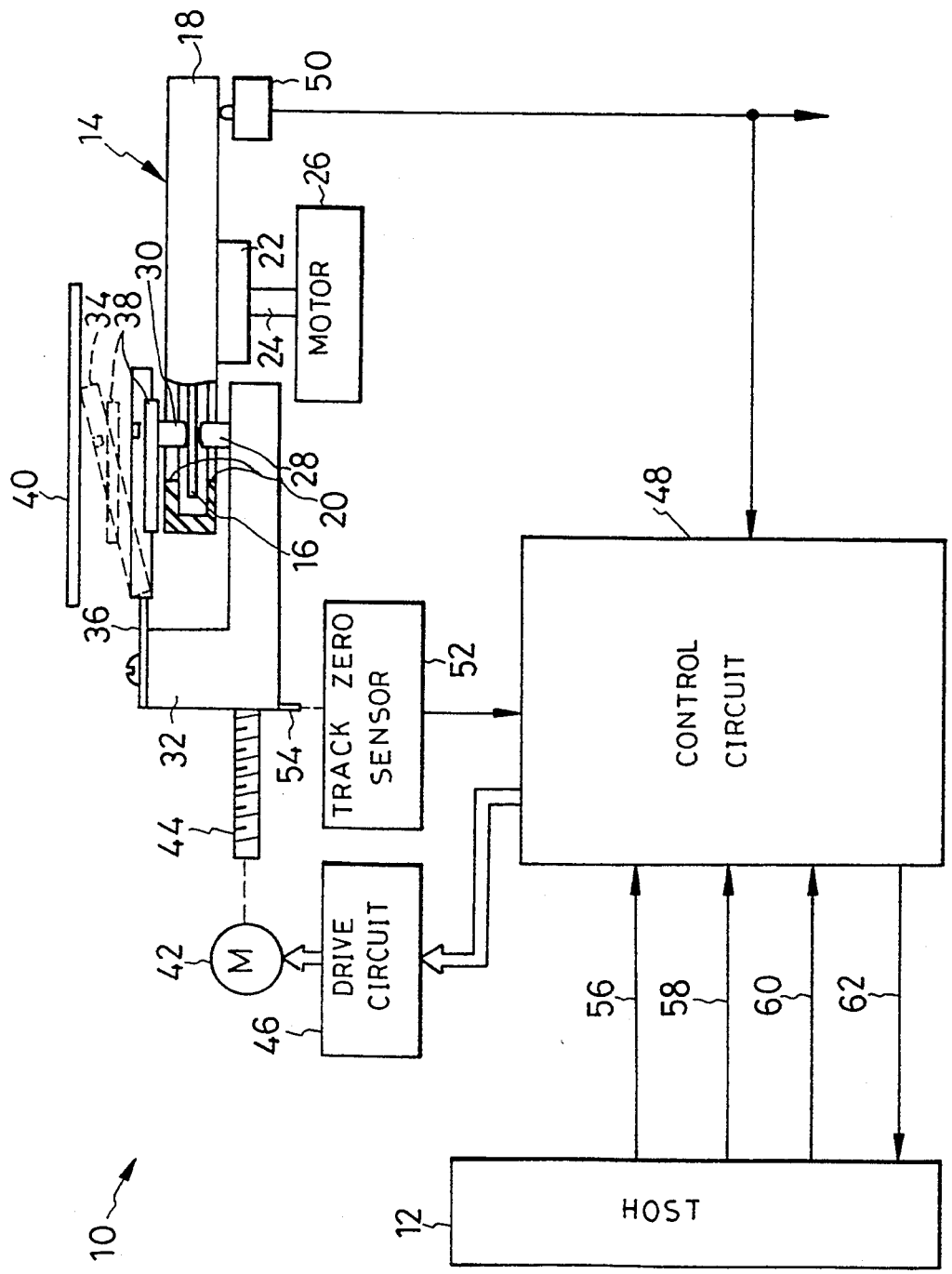
FIG. 1 is a combined pictorial and block diagram of the flexible magnetic disk drive constructed in accordance with the principles of our invention, the disk drive being shown together with a host system.

We will now describe our invention in detail as embodied in a disk drive for use with a flexible magnetic disk of three and a half inch diameter. FIG. 1 shows the disk drive 10 together with a host system 12 external thereto. The disk drive 10 is also shown with a flexible magnetic disk cartridge 14 replaceably loaded in a preassigned data transfer position therein. Itself conventional in construction, the disk cartridge 14 has a flexible magnetic disk 16 rotatably enveloped in a stiff jacket or housing 18. We understand that the disk 16 is double sided in this particular embodiment, having a multiplicity of concentric annular data tracks on its opposite major surfaces. The jacket 18 has a pair of apertures 20 for exposing radial portions of the major surfaces of the disk 16.

The disk drive 10 includes a turntable or drive hub 22 mounted on an upstanding spindle 24 which is driven directly by an electric drive motor 26. With the disk cartridge 14 loaded in the data transfer position within the disk drive 10, the drive hub 22 makes driving engagement with the flexible magnetic disk 16 for imparting rotation thereto. We understand that, normally, the disk 16 rotates in a horizontal plane in the data transfer position. We will therefore use directional terms such as "upper" and "lower", "upward" and "downward", as well as derivatives thereof, with this horizontal attitude of the disk 16 in mind.

For writing and/or reading data on both faces of the disk 16 being held in the data transfer position, the disk drive 10 has a pair of data transducers or heads 28 and 30. The lower transducer 28 is mounted directly to a carriage 32 whereas the upper transducer 30 is mounted to a support beam 34 which in turn is mounted to the carriage 32 via a cantilever spring 36.

The support beam 34 carrying the upper transducer 30 is pivotable with the cantilever spring 36 between a working position indicated by the solid lines and a retracted position indicated by the broken lines. A transducer loading mechanism including a lever 38 is provided for such movement of the support beam 34, and therefore the upper transducer 30, between the working and the retracted position.

The upper transducer 30 is held retracted away from the lower transducer 28 against the force of the cantilever spring 36 when the disk cartridge 14 is not loaded in the disk drive 20. When the disk cartridge 14 is loaded and placed in the data transfer position on the drive hub 22, the transducer loading mechanism operates to move the support beam 34 from the retracted to the working position. As the upper transducer 30 is thus loaded against the disk 16 through one of the apertures 20 in the jacket 18, so is the lower transducer 28 through the other aperture, resulting In the establishment of data transfer contact of both transducers with the opposite faces of the disk. Reference may be had to Kitahara et al. U.S. Pat. No.4,604,666, supra, for more details of the transducer loading mechanism.

Shown fragmentarily and designated 40 is a top plate constituting a part of the casing of the disk drive 10. It will be seen that the support beam 34 butts against the top plate 40 when in the retracted position because of reduction in the thickness or vertical dimension of the disk drive 10 according to our invention. The contact of the retracted support beam 34 with the top plate 40 would give rise to the inconveniences pointed out previously if the transducers 28 and 30 were allowed to travel across the data tracks on the disk 16 when the disk cartridge 14 was not loaded. We have succeeded in eliminating such inconveniences by means set forth hereafter.

As is well known, the carriage 32 travels linearly to move the transducers 28 and 30 radially of the magnetic disk 16 for track to track accessing. For such linear travel of the carriage 32 we have employed an electric bidirectional stepper motor 42 and a lead screw 44 for translating the rotation of the stepper motor into the linear travel of the carriage 32. The stepper motor 42 is drivingly coupled to the lead screw 44, which in turn is threadedly engaged with the carriage 32. Therefore, with the bidirectional, incremental rotation of the stepper motor 42, the pair of transducers 28 and 30 jointly travels back and forth across the data tracks on the opposite major surfaces of the disk 16. The carriage 32, stepper motor 42 and lead screw 44 constitute in combination transducer positioning means for positioning the transducers 28 and 30 on any desired tracks on the disk 16.

A driver circuit 46 is electrically coupled to the stepper motor 42. Under the direction of an electronic control circuit 48 the driver circuit 46 supplies drive pulses to the stepper motor 42 for causing its controlled, bidirectional rotation. The control circuit 48 is illustrated in detail in FIG. 2, to which we will refer presently.

At 50 is seen a disk sensor for signaling the control circuit 48 whether the disk cartridge 14 is in the data transfer position or not. Typically, the disk sensor 50 takes the form of a Microswitch (tradename) to be actuated by the disk cartridge 14 when the latter is loaded in the data transfer position.

Also connected to the control circuit 48 is a Track Zero sensor 52 for sensing the fact that the pair of transducers 28 and 30 are in the outermost Track Zero positions on the disk 16. Typically, the Track Zero sensor 52 takes the form of a combination of a light source and a photoreceptor disposed opposite each other. An optical interrupter 54 on the transducer carriage 312 intervenes between the light source and the photoreceptor when the transducers 128 and 80 are in the Track Zero positions on the disk 16.

The optical Track Zero sensor 512 in combination with the interrupter 54 may not be totally reliable for the determination of the Track Zero positions of the transducers 28 and 30. We therefore suggest that the excitation of a particular phase of the stepper motor 42 be also relied upon for such determination. Suppose for example that the stepper motor 42 is a four phase motor, and that the first phase windings of the motor are to be excited for positioning the transducers 28 and 30 over Track Zero. Then the transducers can be reliably determined to be in the Track Zero positions when the Track Zero sensor 52 signals to that effect and, at the same time, when the first phase windings of the stepper motor are being excited.

The host system 12 comprises a computer, of which the disk drive 10 forms an external storage device, and a controller through which the disk drive is connected to the computer. The host system 12 is connected to the control circuit 48 via a stepping pulse line 56, a stepping direction signal line 58, a drive select signal line 60, and a Track Zero signal line 62. The stepping pulses and the stepping direction signal are for controlling the angle and direction, respectively, of rotation of the stepper motor 42. The drive select signal is for selecting any one of two or more disk drives for data transfer with the associated disk, in cases where such a plurality of disk drives are connected to the host system. The Track Zero signal indicates whether the transducers 28 and 30 are in the Track Zero positions on the disk 16.

Figure 2:
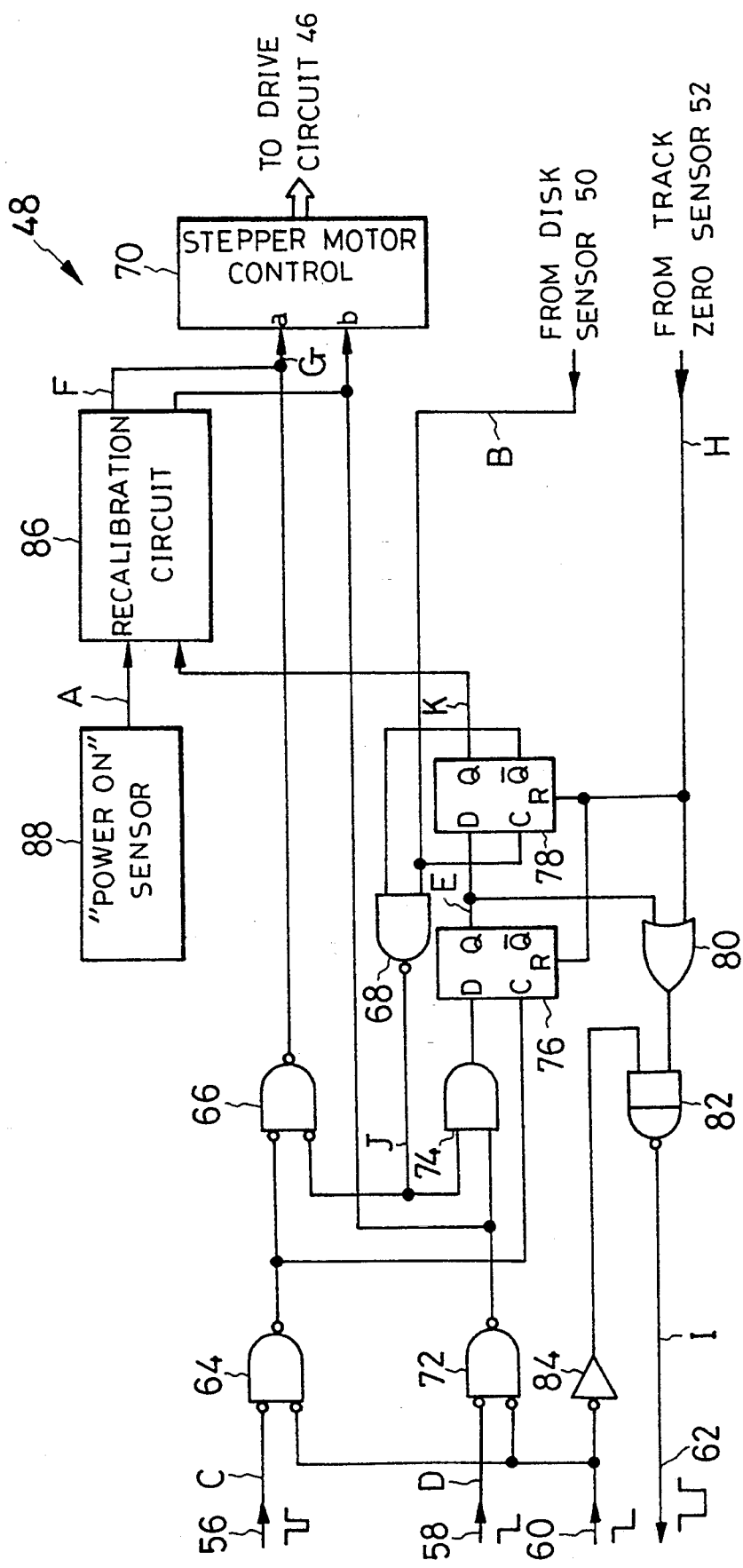
FIG. 2 is a block diagram showing the control circuit of FIG. 1 in more detail.

It is to be understood that we have shown the disk drive 10 in FIGS. 1 and 2 only insofar as is necessary for a full understanding of our invention. A disk drive of standard construction includes a variety of other components such as: (a) a read/write circuit connected to the transducers 28 and 30; (b) a driver circuit connected to the disk drive motor 26, an index sensor for sensing the angular position and rotational speed of the disk 16; (c) a disk positioning circuit for accurately positioning the disk on the drive hub 22 by driving the disk drive motor 26 for a prescribed time following the loading of the disk on the drive hub; (d) a "ready" sensor circuit for informing the host 12 of the fact that the disk drive 10 is ready for the commencement of data transfer with the loaded disk cartridge; and (e) a disk change sensor circuit for informing the host of the fact that a change has been made from one disk cartridge to another. All these circuits are interfaced with the host 12. We have, however, not shown such additional circuits because of their lack of pertinence to our invention.

Reference is not directed to FIG. 2 for a closer study of the control circuit 48. It includes a first AND type OR gate 64 having two inputs connected respectively to the stepping pulse line 56 and to the drive select signal line 60. The output of the first OR gate 64 is connected to a second AND type OR gate 66 which has another input connected to the disk sensor 50 via a first NAND gate 68. The output of the second OR gate 66 is connected to a stepping pulse input a of a stepper motor control circuit 70. A third AND type OR gate 72 has an input connected to the stepping direction signal line 58, and another connected to the drive select signal line 60. The output of the third OR gate 72 is connected to a stepping direction signal input b of the stepper motor control circuit 70.

An AND gate 74 has two inputs connected respectively to the third AND type OR gate 72 and to the first NAND gate 68. The output of the AND gate 74 is connected to a data input D of a first D flip flop 76. This first flip flop has a clock input C connected to the first AND type OR gate 64, a reset input R connected to the Track Zero sensor 52, and a noninverting output Q connected to the data input D of a second D flip flop 78. This second flip flop has a clock input C connected to the disk sensor 50, and a reset input R connected to the Track Zero sensor 52.

The first NAND gate 68 has two inputs connected respectively to the disk sensor 50 and to the inverting output $\bar{Q}$ of the second flip flop 78. The output of the first NAND gate 68 is connected as aforesaid to both second AND type OR gate 66 and AND gate 74.

The noninverting output Q of the first flip flop 76 is also connected to an OR gate 80 which has another input connected to the Track Zero sensor 52. The output of the OR gate 80 is connected to a second NAND gate 82 which has another input connected to the drive select signal line 60 via a NOT circuit 84. The output of the second NAND gate 82 is connected to the host 12 via the Track Zero signal line 62.

At 86 is seen an internal recalibration circuit for generating internal stepping pulses and an internal stepping direction signal needed for positioning the pair of transducers 28 and 30 in the Track Zero positions on the disk 16. The recalibration circuit 86 has an input connected to a "power on" sensor circuit 88, per se well known in the art, which produces a binary signal that goes high when the disk drive 10 is electrically turned on. The recalibration circuit 86 has another input connected to the noninverting output Q of the second flip flop 78.

Both inputs to the recalibration circuit 86 must be high to enable this circuit to put out the internal stepping pulses and the internal stepping direction signal. The state of the noninverting output Q of the second flip flop 78 depends upon the output from the disk sensor 50. Therefore, the recalibration circuit 86 puts out the internal stepping pulses and the internal stepping direction signal when the disk cartridge 14 is loaded in the disk drive 10 and brought to the data transfer position on the drive hub 22 after the disk drive is switched on, as will become better understood from the subsequent description of operation.

The recalibration circuit 86 has two outputs connected respectively to the inputs a and b of the stepper motor control circuit 70. Thus the stepper motor control circuit 70 inputs not only the external stepping pulses and external stepping direction signal from the host 12 but also the internal stepping pulses and internal stepping direction signal from the recalibration circuit 86.

OPERATION

Figure 3:
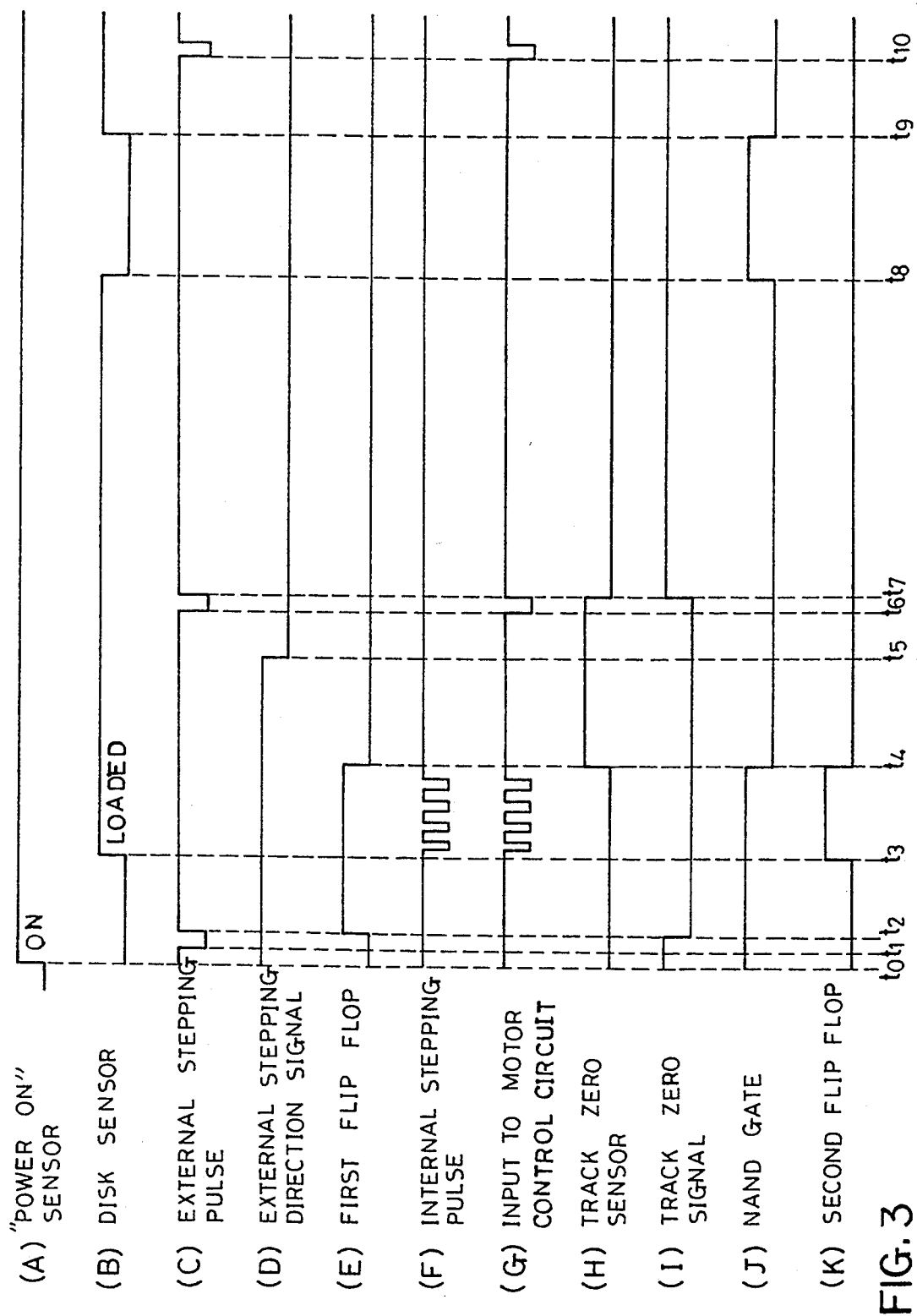
FIG. 3 is a combined waveform and timing diagram explanatory of the operation of the FIG. 1 disk drive, particularly of the FIG. 2 control circuit.

We will refer to the waveform diagram of FIG. 3 for the description of operation of the disk drive 10 constructed as shown in FIGS. 1 and 2. For the ease of understanding we have indicated in FIG. 2 the lines on which the waveforms (A)-(K) of FIG. 3 appear, by the same capitals.

We have drawn the waveforms of FIG. 3 on the assumption that the disk cartridge 14 has not been loaded in the disk drive 10 when it is electrically switched on. The support beam 34 carrying the upper transducer 30 is therefore still in the retracted position indicated by the broken lines in FIG. 1, butting against the top plate 40 of the disk drive casing.

As indicated at (A) in FIG. 3, the "power on" sensor circuit 88 will go high when the disk drive 10 is powered on at a moment $t_0$. However, since the disk cartridge 14 is not yet loaded in the disk drive 10, the output from the disk sensor 50 will then be low, as at (B) in FIG. 3. Consequently, the recalibration circuit 86 is not enabled to put out internal stepping pulses at the moment $t_0$, so that no recalibration of the transducers 28 and 30 will take place according to our invention. Should the recalibration circuit 86 be allowed to put out internal stepping pulses for recalibration immediately upon closure of the power switch and in the absence of the disk cartridge, as has been the case heretofore, the support beam 34 would travel in sliding contact with the top plate 40, with the consequent inconveniences pointed out previously. We have eliminated these inconveniences by postponing the recalibration the transducers until the disk cartridge is loaded subsequently.

Let us consider a rare case where the host system 12 produces external stepping pulse over the line 56, as indicated from moment $t_1$ to moment $t_2$ at (C) in FIG. 3, immediately after the system is switched on at the moment $t_0$ and before the disk cartridge 14 is loaded in the disk drive 10 at a moment $t_3$. The external stepping direction signal fed from the host system 12 over the line 58 is then shown to be high, as at (D) in FIG. 3, commanding the travel of the transducers 28 and 30 radially outwardly of the disk 16. Then the AND type OR gate 64 will go low at the moment $t_1$ in response to the external stepping pulse. Clocked at the moment $t_2$ by the output from the AND type OR gate 64, the flip flop 76 will take in the output from the AND gate 74.

We have assumed that the output from the disk sensor 60 is low at the moment $t_2$, so that the NAND gate 68 will then be high. If then the drive select signal on the line 60 is low, the AND type OR gate 72 will be high. Consequently, the AND gate 74 will be high. The flip flop 76 will take in this high output from the AND gate 74, so that the noninverting output Q of this flip flop will go high at the moment $t_2$, as at (E) in FIG. 3.

Inputting the high output from the flip flop 76 via the OR gate 80, the NAND gate 82 will go low at the moment $t_2$, as at (I) in FIG. 3. This low output from the NAND gate 82, sent to the host 12 by way of the Track Zero signal line 62, serves to falsely inform the host that the transducers 28 and 30 are on Track Zero on the disk 16, despite the fact that the host has delivered the stepping pulse from moment $t_1$ to moment $t_2$. We therefore call the output from the flip flop 76 a false Track Zero signal, in contrast to the true Track Zero signal sent from the Track Zero sensor 52 to the NAND gate 82 via the OR gate 80. The true Track Zero signal is now low, as at (It) in FIG. 3, because actually the transducers 28 and 30 are not on Track Zero.

The host 12 will command a seek retry on knowing from the false Track Zero signal that the transducers 28 and 30 will not move to the desired track in response to the stepping pulse it delivered during the $t_1$–$t_2$ period. However, as will be noted from FIG. 2, external stepping pulses from the host 12 must pass through the AND type OR gate 66 before reaching the stepper motor control circuit 70. The AND type OR gate 66 has its other input connected to the disk sensor 50 via the NAND gate 68. Consequently, until the disk cartridge 14 is loaded at a moment $t_3$, as at (B) in FIG. 3, no external stepping pulses will be applied to the stepper motor control circuit 70. The disk drive 10 will therefore not respond to any external stepping pulses incoming before the moment $t_3$, thereby preventing the movement of the upper transducer support beam 34 in sliding contact with the top plate 40.

At the moment $t_3$, when the disk cartridge 14 is loaded in the data transfer position on the drive hub 22, the disk sensor 50 will go high as at (B) in FIG. 3. Clocked by this high output from the disk sensor 50, the second flip flop 78 will take in the output from the first flip flop 76. Thus the noninverting output Q of the second flip flop 78 will go high at the moment $t_3$, as at (K) in FIG. 3.

Both inputs to the recalibration circuit 86 are now high, so that this circuit will deliver internal stepping pulses to the input a of the stepper motor control circuit 70, as at (F) and (G) in FIG. 3. The recalibration circuit 86 will also apply the internal stepping signal to the input b of the stepper motor control circuit 70, commanding the transducers 28 and 30 to step out. Thereupon the stepper motor control circuit 70 will conventionally respond to the incoming stepping pulses and stepping direction signal to cause the transducers to be positioned on Track Zero on both faces of the disk 16.

We understand that both transducers have been loaded against the disk 16 immediately upon placement of the disk cartridge 14 in the data transfer position, with the support beam 34 pivoted from the phantom retracted position of FIG. 1 to the solid line working position. Therefore, the support beam 34 will not move in sliding contact with the top plate 40 of the disk drive casing during such recalibration of the transducers 28 and 30.

When the transducers 28 and 30 are positioned on Track Zero as above, the Track Zero sensor 52 will go high at a moment $t_4$, as at (H) in FIG. 3. Thereupon the flip flops 76 and 78 will be both reset. Although the noted false Track Zero signal from the first flip flop 76 goes low when it is so reset, as at (E) in FIG. 3, the high true Track Zero signal from the Track Zero sensor 52 will be applied to the NAND gate 82 via the OR gate 80. Thus the NAND gate 82 will remain low after the moment $t_4$, as at (I) in FIG. 3, now truly informing the host 12 that the transducers are on Track Zero.

At (D) in FIG. 3 is shown the external stepping direction signal to go low, commanding the radially inward travel of the transducers 28 and 30 with respect to the disk 16, at a moment $t_5$ following the completion of recalibration at the moment $t_4$. Then an external stepping pulse is shown supplied during a $t_6$–$t_7$ time interval, as at (C) in FIG. 3. This external stepping pulse will be applied to the stepper motor control circuit 70, as at (G) in FIG. 3, without being interrupted by the AND type OR gates 64 and 66.

With the consequent travel of the transducers 28 and 30 to the desired destination track, the Track Zero sensor 52 will go low at the moment $t_7$, as at (II) in FIG. B, indicating that the transducers are not on Track Zero. Thereupon the NAND gate 82 will go high, as at (I) in FIG. 3. Thus, although the host 12 was falsely informed that the transducers were on Track Zero from moment $t_2$ to moment $t_4$, the transducer positions after the moment $t_4$, when the recalibration of the transducers was completed in response to the loading of the disk cartridge 14 at the moment $t_3$, are in accord with those specified by the host.

The disk cartridge 14 is shown unloaded from the disk drive 10 at a moment $t_8$ and reloaded at a moment $t_9$, as at (B) in FIG. 3, with the disk drive held powered on as at (A) in FIG. 3. If the external stepping direction signal is low at the moment $t_9$, as at (D) in FIG. 3, commanding the transducers to step in, then the AND type OR gate 72 will be low, and so will be the AND gate 74. Consequently, the first flip flop 76 will remain low, as at (E) in FIG. 3, in the face of an external stepping pulse supplied at a subsequent moment $t_{10}$ as at (C) in FIG. 3. Thus, since both flip flops 76 and 78 will remain low, no recalibration will take place in response to the reloading of the disk cartridge 14 at the moment $t_9$.

We have assumed that the disk cartridge 14 is unloaded from the disk drive 10, and the external stepping direction is low, from moment $t_8$ to moment $t_9$. Actually, however, such a state will rarely take place in the normal use of disk drives. It will also be rare that any external stepping pulses be supplied during the $t_8$–$t_9$ period. If they are, they will be blocked by the AND type OR gate 66. Since then the transducers 28 and 30 will not move in response to such external stepping pulses, the actual track position of the transducers will disagree with their track position known to the host 12. However, this disagreement will lead to no serious inconvenience for the following reason:

As the transducers 28 and 30 read one of the sector numbers conventionally prerecorded on the identification fields of the data tracks on the disk 16 after the moment $t_9$, the host 12 will compare the number with that it has specified. If they disagree, the host will command a seek retry, which conventionally involves the recalibration of the transducers on Track Zero.

The Track Zero sensor 52 may indicate that the transducers 28 and 30 are on Track Zero during the $t_8$–$t_9$ period. If then the host 12 puts out stepping pulses along with the stepping direction signal commanding the transducers to step in, the gate 66 will block such external stepping pulses, preventing the travel of the transducers and therefore of the upper transducer support beam 34.

Here again the actual track position of the transducers will disagree with their track position known to the host 12. Then, after the moment $t_9$ when the disk cartridge is reloaded, the host will command a seek retry on knowing that the sector number it has specified differs from that read by the transducers after the moment $t_9$.

Although we have shown and described our invention in terms of but one preferred embodiment thereof, we recognize, of course, that our invention could be embodied in other forms within the broad teaching hereof. The following, then, is a brief list of possible modifications or alterations of the illustrated embodiment which we believe all fall within the scope of our invention:

1. Instead of the recalibration circuit 86 connected to the external stepping pulse line and external stepping direction signal line as in FIG. 2, there could be employed an internal stepping pulse generator and an internal stepping direction signal generator which function not only to deliver the calibration signals to the stepper motor control circuit 70 when internally enabled to do so, but also to deliver stepping pulses and the stepping direction signal to the stepper motor control circuit in response to external stepping pulses and external stepping direction signal.

2. RS flip flops or other equivalent circuit means could be substituted for the D flip flops 76 and 78.

3. Circuit means could be provided for invalidating external stepping pulses that may be supplied during the recalibration period $t_3$–$t_4$ of FIG. 3.

4. Our invention could be applied to disk drives for use with single sided disks, having but one data transfer mounted to a support beam for movement between the working and retracted positions indicated in FIG. 1.

5. The "power on" sensor 88 could be provided to the host 12, instead of to the disk-drive 10.

What we claim is:

1. An apparatus for data transfer, under the direction of a host system, with a rotating data storage disk being replaceably held in a preassigned data transfer position within the apparatus, the disk having a principal plane and a multiplicity of concentric annular data tracks on a major surface thereof, the data tracks including a reference track, the apparatus comprising:

(a) a data transducer movable between a working position, in which the transfer is capable of data transfer with the major surface of the rotating disk being held in the preassigned data transfer position, and a retracted position in which the transducer permits the disk to be loaded in and unloaded from the apparatus;

(b) support means for holding the transducer in the retracted position when the disk is not in the data transfer position, and in the working position when the disk is in the data transfer position;

(c) a transducer positioning means including an electric stepper motor for moving the transducer from track to track on the disk, the support means moving with the transducer across the tracks on the disk;

(d) a stepper motor drive circuit for applying drive pulses to the stepper motor in order to cause controlled rotation thereof;

(e) input means for inputting stepping pulses from the host system;

(f) a stepper motor control circuit connected between the input means and the stepper motor drive circuit for causing the stepper motor drive circuit to apply the drive pulses to the stepper motor in response to the stepping pulses;

(g) a disk sensor for producing an output indicative of whether the disk is in the data transfer position or not;

(h) circuit means connected between the input means and the stepper motor control circuit and also connected to the disk sensor for preventing the delivery of the stepping pulses from the input means to the stepper motor control circuit when the disk is not in the data transfer position, [in order to avoid the movement of the support means in sliding contract with the fixed member, (i) a reference track sensor for delivering to the host system a true reference track signal indicative of whether the transducer is positioned over the reference track on the disk;

second input means for inputting a stepping direction signal from the host system, the input stepping direction signal being applied to the stepper motor control circuit in order to determine the direction of rotation of the stepper motor and hence the direction of travel of the transducer toward or away from the reference track; and (k) second circuit means connected to the disk sensor and the second input means for delivering to the host system a false reference track signal falsely indicating that the transducer is positioned over the reference track on the disk, when the disk is not in the data transfer position add when, at the same time, the stepping direction signal indicates the travel of the transducer toward the reference track.

2. An apparatus for data transfer, under the direction of a host system, with a rotating data storage disk being replaceably held in a preassigned data transfer position within the apparatus, the disk having a principal plane and a multiplicity of concentric annular data tracks on a major surface thereof, the data tracks including an endmost reference track, the apparatus comprising:

(a) a data transfer movable between a working position, in which the transducer is capable of data transfer with the major surface of the rotating disk being held in the preassigned data transfer position, and a retracted position in which the transducer permits the disk to be loaded in and unloaded from the apparatus;

(b) support means for holding the transducer in the retracted position when the disk is not in the data transfer position, and in the working position when the disk is in the data transfer position;

(c) a transducer positioning means including and electric stepper motor for moving the transducer from track to track on the disk, the support means moving with the transducer across the tracks on the disk;

(d) a stepper motor drive circuit connected to the stepper motor in order to cause controlled rotation thereof;

(e) first input means for inputting external stepping pulses from the host system;

(f) second input means for inputting an external stepping direction signal from the host system, the stepping direction signal being indicative of the direction of rotation of the stepper motor and hence the direction of travel of the transducer toward or away from the reference track;

(g) a stepper motor control circuit connected between the first and the second input means and the stepper motor drive circuit for causing the stepper motor drive circuit to rotate the stepper motor through an angle determined by the stepping pulses and in a direction determined by the stepping direction signal;

(h) a reference track sensor for delivering to the host system a true reference track signal indicative of whether the transducer is positioned over the reference track on the disk;

(i) a disk sensor for producing an output indicative of whether the disk is in the data transfer position or not;

(j) first circuit means connected to the disk sensor and the second input means for delivering to the host system a false reference track signal falsely indicating that the transducer is positioned over the reference track on the disk, when the disk is not in the data transfer position and when, at the same time, the external stepping direction signal indicates the travel of the transducer toward the reference track;

(k) a "power on" sensor for producing an output indicative of whether the apparatus is electrically powered on or not;

(1) a recalibration circuit connected between the stepper motor control circuit and the "power on" sensor for delivering to the stepper motor control circuit internal stepping pulses and an internal stepping direction signal, which are similar respectively to the external stepping pulses and to the external stepping direction signal, for positioning the transducer over the reference track on the disk when the apparatus is powered on; and (m) second circuit means connected between the disk sensor and the recalibration circuit for preventing the delivery of the internal stepping pulses from the recalibration circuit to the stepper motor control circuit when the disk is not in the data transfer position.

3. The apparatus of claim 2 further comprising third circuit means connected between the first input means and the stepper motor control circuit and also connected to the disk sensor for preventing the delivery of the external stepping pulses to the stepper motor control circuit when the disk is not in the data transfer position.

* * * * *